US008941563B2

(12) United States Patent
Artusi

(10) Patent No.: US 8,941,563 B2
(45) Date of Patent: Jan. 27, 2015

(54) DISPLAY FOR DIGITAL IMAGES

(75) Inventor: Alessandro Artusi, Nicosia (CY)

(73) Assignee: Polygon Systems UK LLP, Rugby (GB)

( * ) Notice: Subject to any disclaimer, the term of this patent is extended or adjusted under 35 U.S.C. 154(b) by 142 days.

(21) Appl. No.: 13/389,052

(22) PCT Filed: Aug. 9, 2010

(86) PCT No.: PCT/EP2010/061545
§ 371 (c)(1),
(2), (4) Date: Feb. 6, 2012

(87) PCT Pub. No.: WO2011/015669
PCT Pub. Date: Feb. 10, 2011

(65) Prior Publication Data

US 2012/0133606 A1 May 31, 2012

(30) Foreign Application Priority Data

Aug. 7, 2009 (GB) .................................. 0913805.8

(51) Int. Cl.
*G06F 3/041* (2006.01)
*G09G 3/30* (2006.01)
*G09G 3/20* (2006.01)

(52) U.S. Cl.
CPC ............ *G09G 3/20* (2013.01); *G09G 2300/023* (2013.01)
USPC ............. 345/76; 345/102; 345/173; 345/589; 345/617

(58) Field of Classification Search
USPC ................ 345/6, 173, 619, 76–102; 313/506; 349/64
See application file for complete search history.

(56) References Cited

U.S. PATENT DOCUMENTS

| | | | | |
|---|---|---|---|---|
| 2005/0062410 | A1 * | 3/2005 | Bell et al. | 313/506 |
| 2005/0206582 | A1 * | 9/2005 | Bell et al. | 345/6 |
| 2008/0122865 | A1 * | 5/2008 | Vanmoor | 345/619 |
| 2009/0046219 | A1 * | 2/2009 | Bell et al. | 349/64 |
| 2009/0085929 | A1 * | 4/2009 | Whitehead et al. | 345/617 |
| 2010/0238189 | A1 * | 9/2010 | Feng | 345/589 |

* cited by examiner

*Primary Examiner* — Amare Mengistu
*Assistant Examiner* — Jennifer Zubajlo
(74) *Attorney, Agent, or Firm* — Walters & Wasylyna LLC

(57) ABSTRACT

The invention relates to a display device comprising a first light for emitting light rays and a first modulator operable to modulate those light rays for generating primary modulated light ray (10). A second light-source having a second modulator operable to generate secondary modulated light rays is also provided (14). The second light-source is transparent and is disposed relative to the first light-source such that primary modulated light rays generated by the first light-source are transmittable though the second light-source whereby a composite light-output comprising both primary and secondary modulated light rays is generated.

27 Claims, 2 Drawing Sheets

DISPLAY FOR DIGITAL IMAGES

This application is a U.S. national phase application of Intl. App. No. PCT/EP2010/061545 filed on Aug. 9, 2010, which claims priority from GB0913805.8 filed on Aug. 7, 2009.

FIELD OF THE INVENTION

The invention relates to displays for displaying digital images, including High-Dynamic-Range (HDR) displays; a method of making the displays and a variety of appliances comprising such displays. More specifically, but not exclusively, the invention relates to an HDR display comprising at least one substantially transparent component. Even more specifically but not exclusively the transparent component is a transparent light-emitting component that may optionally be formed from transparent organic light-emitting diodes (TOLED).

BACKGROUND OF THE INVENTION

Luminance Dynamic Range is a term used to describe the ratio between the lowest and highest luminance intensities of an image. Digital images that can reproduce a large portion of the luminance dynamic range visible by the human eye are called High Dynamic Range (HDR) images.

In commercial terms, the dynamic range of an electronic imaging device has been known as the “contrast ratio”. It is a measurement of the brightest and darkest aspects of a displayed image. In addition to the ratio between the darkest and lightest outputs that a display can deliver, the level of adjustment between the lowest and highest luminance levels plays a significant part in the quality of a rendered image. There are many ways of calculating the contrast ratio or dynamic range of a display device. As used herein the term contrast ratio (CR) is used to refer to the ratio between the brightest output $I_{max}$ of a display device and the lowest output $I_{min}$ of a display device. As such $$CR = \frac{I_{max}}{I_{min}}.$$

The term Dynamic Range (DR) is used to refer to the number of transmission levels that a display device has between the lowest luminance level $I_{min}$ and the brightest luminance level $I_{max}$.

Recent developments in display technology have realised High-Dynamic Range displays that can display a range of light that is 30 times brighter and 10 times darker than conventional computer displays. However, the dynamic range of the human eye is far greater than current display technologies can achieve and even the best known display devices achieve a contrast ratio or dynamic range that is considerably below the visual capabilities of the human eye. To improve digital images it is required to achieve display devices with better contrast ratio and/or dynamic range performance.

In US 2008/0174614 to Dolby a display device is disclosed which comprises a backlight source and two spatial light modulators. The two light modulators are disposed in front of the light source. The two light modulators are provided by LCD panels. The luminance at a point on the screen of the display device is determined by the intensity of light incident upon the front-most LCD panel and the degree to which the LCD panel at that point absorbs light being transmitted through it. Typically, LCD panels have a transparency in the range 3-8% even when switched to “white” and so most light energy is actually absorbed.

In WO 2003/077013 to The University of British Columbia a similar display to that described in US 2008/0174614 is shown wherein the backlight source and first modulator are provided by a single matrix of LEDs. Due to the size of the LEDs, their number is much lower than the number of pixels of the front-most LCD panel. This together with the light scattering between the LED panel and the front-most LCD panel can, disadvantageously, generate visible artefacts on the display screen which degrade the rendered images.

Another display device is described in US 2008/0088647 to Apple Inc. The display device disclosed therein has a single bright back-light source and two panels such as LCD light modulating panels. A table is generated of the possible luminance levels. The display is said to feature an extremely high contrast ratio due to the ranges of possible transmission levels at the pixel level of the first and second panels. In US 2008/0088647 a luminance transfer function for the display device is given as:

$$G(i,j)=Y(0)\times Ta(i)\times Tb(j)\times C$$

wherein Y(0) is the luminance level of the back-light source; C is a constant and G(i,j) is the luminance level corresponding to transmission levels Ta and Tb of the first and second panels respectively.

The transfer function calculates the maximum number of transmission levels that in combination the two LCD panels can achieve (which includes non-unique transmission levels). As such the above calculation provides an indication of the maximum possible dynamic range of the display device disclosed.

Limitations of the presently known technology include: limitations in the brightness of the display where most of the source-light is attenuated by an LCD modulator, high power consumption of the display devices, screen-size restrictions, contrast ratio and dynamic range performance, fragility of the display and thinness of the display.

High power consumption of the display devices can result in their over-heating. As a consequence, the time that the device can be used is restricted and hence its potential applications. Although coolant can be used to minimise the effects of the high energy-consumption, it does not solve the over-heating problem. Use of coolant is also impractical for many applications and limits the possible applications of such HDR displays.

Yet a further limitation of some known displays is their size. The structure of the current HDR display limits their production on a small scale in all three dimensions, this can limit their application in mobile or hand held devices and in devices where a thinner screen is beneficial. Furthermore, for such and other applications, it is desirable that a display device be flexible.

The present invention seeks to mitigate these and other problems associated with the prior art and seeks to provide an improvement in known display technologies.

SUMMARY OF INVENTION

According to a first aspect the invention provides a display device comprising a first light source for emitting light rays; a first modulator operable to modulate those light rays for generating primary modulated light rays and a second light-source having a second modulator operable to generate secondary modulated light rays; the second light-source and second modulator being transparent and being disposed relative to the first light-source such that primary modulated light rays generated by the first light-source are transmittable though the second light-source and second modulator whereby a composite light-output comprising both primary and secondary modulated light rays is generated.

Optionally the first light source comprises any one or more of a laser, an LED, digital light projector, and Organic Light-Emitting Diode (OLED) and the first modulator comprises an array of individual light affecting pixels such as an LCD panel or transparent LCD panel.

Preferably, the first light-source and first modulator are provided as an integral component comprising any of a laser, an LED, an Organic Light-Emitting Diode (OLED) and a Transparent Organic-Light Emitting Diode (TOLED) arranged as an array of individual modulated light emitting pixels. Even more preferably, the array of individual modulated light emitting pixels comprises a matrix of Organic Light-Emitting Diodes (OLEDs), TOLEDs, PHOLEDs, WOLEDs, PMOLEDs or AMOLEDs.

In this way a display device with low power consumption and yet high dynamic range with good contrast ratio and good image quality is achievable. Furthermore the use of organic light emitting components enables the display to be flexible and as such is more robust and less prone to damage by scratching as can be a problem with glass or other fragile material based displays.

A further optional aspect of the invention is that the second light-source and second modulator are provided as an integral component comprising an array of transparent electro-luminescent pixels. Though more preferably the second light-source and second modulator are provided as an integral component comprising an array of Transparent Organic Light-Emitting Diode (TOLED) pixels. Using an array of TOLED pixels in alignment with an array of OLED or TOLED pixels provided by the first light source and first modulator provides for a compact display that can, if required, be completely transparent in the off state. The display has beneficial qualities in terms of the image quality and in terms of low power consumption. This enables the display device to be used in mobile and hand-held devices where battery life can be limited. Furthermore the display devices according to this aspect of the invention can suffer less than known devices from over-heating.

Optionally, the off-state transparency of the first and/or second light-source is greater than about 10%. Preferably the off-state transparency of the first and/or second light-source is between about 45% and about 75%. More preferably the off-state transparency of the first and/or second light-source is between about 45% and about 95%.

Optionally, the display device may further comprise at least one additional light-source having an integrally formed modulator operable to generate additional modulated light rays; the or each additional light-source being transparent and being disposed relative to the second and first light-sources such that the composite light-output comprising both primary and secondary modulated light rays generated by the first and second light-sources is transmittable though the or each additional light-source whereby a further composite light-output comprising primary, secondary and one or more additional modulated light rays is generated. Optionally, wherein the or each additional light-source comprises an array of Transparent Organic Light-Emitting Diode (TOLED) pixels. Alternatively, the or each additional light-source comprises an array of transparent electro-luminescent pixels.

Optionally, the off-state transparency of the second light-source is greater than about 10%. Preferably the off-state transparency of the second light-source is between about 45% and about 75%. More preferably the off-state transparency of the second light-source is between about 45% and about 95%.

Optionally, the second light-source may comprise an array of TOLED pixels and may comprise two additional light-sources each comprising an array of TOLED pixels, wherein one of the second and two additional light-sources emits red-coloured light, another of the second and two additional light-sources emits green-coloured light and the remaining one of the second and two additional light-sources emits blue-coloured light.

Optionally, the first light-source and first modulator are provided as an integral component comprising Transparent Organic-Light Emitting Diodes (TOLEDs) arranged as an array of individual modulated light emitting pixels such that the display device is transparent.

Preferably, the display device may further comprise optical components for facilitating the incidence of primary modulated light rays, secondary modulated light rays and/or any additional modulated light rays onto a successive light-source and/or display screen.

The combination of beneficial qualities referred to may facilitate the use of such display devices in a broad spectrum of applications. By way of non-exhaustive examples, these include: electronic devices having display screens including televisions, computer monitors, communication devices, hand held electronic devices, mobile telephones or mobile communication devices; display screens for advertising for example digital bill boards; display screens for entertainment; display screens used for purely aesthetic purposes for example showing art work and other images; analytic instruments, for example electronic microscopes, mass spectrometers, chromatography analysis and other medical devices; navigation systems for cars, aeroplanes, boats, helicopters and any other vehicle and heads-up displays; head mounted displays; rear-projection displays; Automatic Virtual Environment, in particular Cave Automatic Virtual Environments (CAVE).

Optionally, the digital display screen may be curved and/or flexible and/or used in touch-screen type applications where the display screen is utilized in conjunction with a touch-response screen. These and other aforementioned qualities enable the display screens to have application in new areas for example in clothing, textiles and other decorative items such as wall dressings, as floorings and digital posters. It will be understood that a digital display that is thin, flexible and yet robust that can readily be formed in large panels could be adapted for many new applications which current digital display technology cannot support.

A second aspect of the invention provides a front-projection digital display system comprising a projector having a display device as described above, an optical focusing element and a display screen, the projector being coupled to the optical focusing element for focusing an image generated by the projector onto the front of the display screen.

According to a third aspect, the invention provides a method of generating a digital image on a display screen comprising:

providing a display device according to the above paragraphs;

providing a rear or front-projection display screen for displaying the digital image;

providing one or more signal generators for issuing display signals to the modulator of the first light source and to the modulator of the second light source;

generating a composite light output as determined by the display signals.

BRIEF DESCRIPTION OF THE DRAWINGS

Exemplary embodiments of the invention will now be described with reference to the accompanying drawings, in which.

DETAILED DESCRIPTION OF PREFERRED EMBODIMENTS

Figure 1:
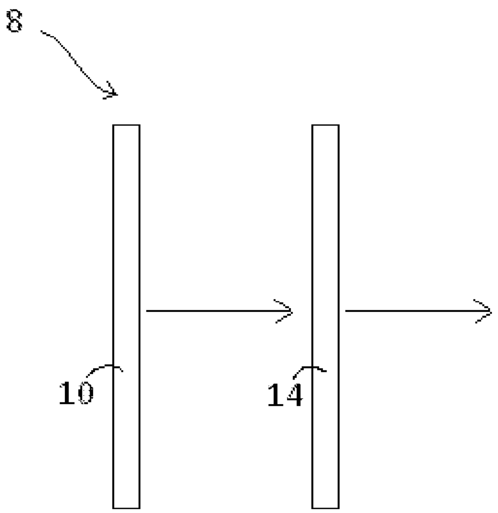
FIG. 1 shows a schematic illustration of display device according to a first embodiment of the invention.
Figure 2:
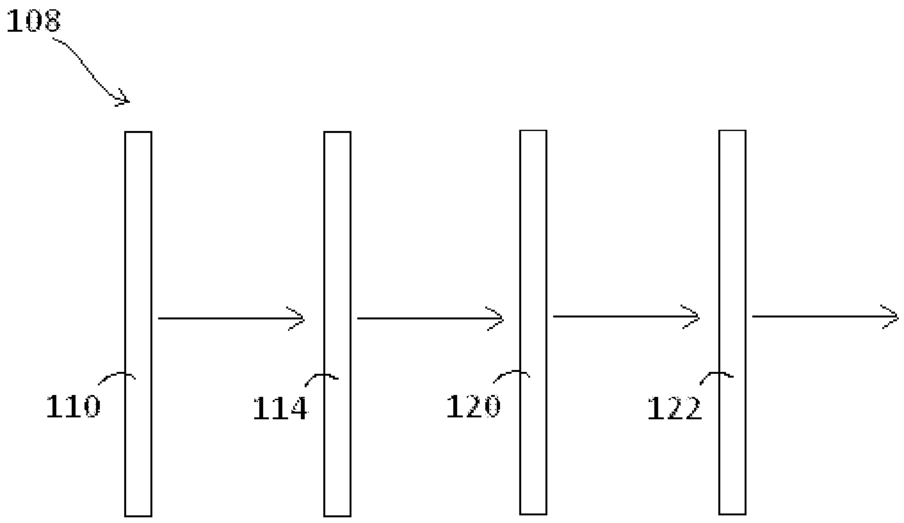
FIG. 2 shows a schematic illustration of display device according to a second embodiment of the invention.

Specific embodiments of the invention will now be described. The embodiments are examples and as such do not represent an exhaustive list of all of the ways in which the invention could be implemented. The law does not require, and it would be prohibitive to describe and illustrate every possible variation and combination of the way in which the invention could be put into effect. The detailed description of each of the exemplary embodiments contains specific details in order to provide the reader with an understanding of the invention; however the invention may be implemented without these particular details.

In the different exemplary embodiments described, like reference numerals have, where possible, been used to indicate like features in each of the illustrated embodiments, albeit, the pre-fix '100', '200' and so on has been used to distinguish the different embodiments from one another.

A digital image is created by a number of pixels or dots each showing a colour and brightness level that corresponds to the digital image. The term pixel is used throughout the description to describe an individual component of an emissive panel; modulating panel or display panel. It will be understood that the overall number of pixels contained in any of the emissive panel, modulating panel and display panel may vary. The resolution of each of the panels may not be equal. The size of the panels and overall resolution is not limiting and although it is common to have certain resolutions for example 1920×1080 or 1600×1200 or 1400×1050, the display devices of the present invention may have many configurations of pixels in the display panel.

Turning now to FIG. 1, there is illustrated schematically the primary components of a display device 8 according to a first embodiment of the invention. The display device 8 comprises a back-panel 10 and front-most panel 14. The back-panel 10 and front-most panel 14 are each capable of emitting electromagnetic radiation in the visible range (in other words light). The light-emitted by the back panel 10 is incident upon the front-most panel 14. Light incident upon the front-most panel 14 is controllably transmitted by that panel and coupled to light actually emitted by that front-most panel 14.

The back-panel 10 and front-most panel 14 each comprise an array of individually addressable elements (pixels). As such, the back-panel 10 and front-most panel 14 are both sources of modulated light. In this specific arrangement, the number of individually addressable elements in the array of the back-panel 10 is equal to the number of individually addressable elements in the array of the front-most panel 14. Because the back-panel 10 and front-most panel 14 have the same resolution, the light emitted (i.e. the light output) from each pixel of the back-panel 10 is incident upon an aligned and hence corresponding pixel of the front-most panel 14. The display device 8 therefore has a number of pixels equal to the number of addressable elements of the back-panel 10 and front-most panel 14. Because each addressable element is individually controllable the intensity of light emitted or transmitted by each element can be adjusted to achieve a desired output. The image rendered on and emitted by a display screen (not shown in FIG. 1) can be recreated in a realistic way. Each pixel of the display device 8 contributes to the overall image rendered on the display screen. The quality of a rendered image is, among other things, dependent upon: the number of pixels; the sharpness of those pixels; and the luminance-dynamic range of those pixels with regard to one another.

The front-most panel 14 is formed of suitable material such that it has a transparency, in its off-state, preferably greater than 10%. As such at least some of the light emitted by the back-panel 10 and incident upon the front-most panel 14 can be transmitted through the front-most panel 14 and onto an optional rear-projection display screen (not shown). The intensity of the light-incident upon the front-most panel 14 is attenuated to a lesser degree if the front-most panel has a higher transparency. In this way the dynamic-range of the display device 8 is enhanced. Firstly because the light out-put by the display screen 8 is directly proportional to the light out-put by each of the back and front panels 10, 14 and secondly because each of the back and front panels 10, 14 comprises pixels that emit light that is controllable through a range of luminance levels.

The maximum intensity of light ($I_{max}$) that can be rendered upon the display screen is:

$$I_{max}=(I_{back\,panel}\times T+I_{front\,panel})\times c$$

wherein, $I_{back\,panel}$ is the brightest output of the back panel 10; T is the transparency factor of the front panel 14; $I_{front\,panel}$ is the brightest output of the front panel 14; and c is a constant.

By increasing the transparency factor T, the maximum brightness that can be output by the display device is increased and the performance of the display enhanced. Also a higher contrast ratio $$\left(\text{calculated as: } \frac{I_{max}}{I_{min}}\right)$$

of the overall display is achievable with an increased transparency factor.

Preferably the off-state transparency of the front panel 14 is in the region of about 30% to about 95%. A value of about 70% off-state transparency offers an improved dynamic range. The optimum level of transparency is 100%, however a transparency between about 30% to about 95% or more specifically between about 45% to about 75% would offer good performance. The specific transparency values are determined by the materials used for the emitting and modulating panels (front panel 14 in this embodiment). By "off-state transparency" it is meant the transparency to light in the visible wavelength region when the device or specific pixel is not drawing current.

In addition, the lowest level of light output is also controllable to very low levels because the addressable elements of the back and front panels 10, 14 can each individually be operated to output very low levels of light. This again offers improvement in the contrast ratio. The low levels of light can be achieved by either switching corresponding pixels of both the backlight panel 10 and front-most panel 14 off completely; switching them both to very low level output or switching them to a combination position where one pixel is off and one pixel is switched on to a very low level.

Furthermore, because the back panel 10 and front-panel 14 are each individually controllable, the display devices offers a beneficial level of control between the lowest total light output by the display device and the highest total output by the display device. The incremental adjustment offered by providing two modulated light-emitting panels 10, 14 is proportional to the multiplication of the number of transmission levels provided by the back-panel 10 with the number of transmission levels provided by the front-panel 14.

To form a complete packaged display device, the back and front-most panels 10, 14 are attached by means of a frame or other mechanical fixing disposed about their outer edges (not shown). An electronic controller (not shown) is coupled to the display device 8 to supply control signals to the individual pixel elements of the back-panel 10 and of the front-most panel 14. The electronic controller or drive mechanism will be fed with information relating to the image that should be rendered on the display. Accordingly each addressable pixel element of the back and front-most panels 10, 14 is controlled to adjust the brightness of each pixel. In this way a monochrome image is produced. To achieve the relevant colour required either filters or coloured emitters are used (not shown). Furthermore, because the total luminance output by each pixel of the device is a combination of the luminance level of the front panel 14 and the luminance level of the back panel 10 a look-up table such as that described in US2008/0088647 could be utilised to determine the nature of the control or drive signal that should be sent to each of the panels in order that a desired total output level is achieved.

In optional embodiments of this first illustrated display device further optical components are provided to focus and/or guide the light emitted by each individually addressable element of the back-panel 10 onto the corresponding addressable element of the front-most panel 14. Such optical components may comprise, but are not limited any one or a combination of mirrors, optical lenses, a matrix of optical fibres, holographic lenses and/or Fresnel lenses. Other optical components such as a collimator and/or diffuser may additionally be utilised.

In other embodiments of the invention, the front-most panel 14 has a lower or alternatively higher number of addressable elements compared to the number of individually addressable elements in the array of the back-panel 10.

In a preferred embodiment, the back-panel 10 is provided by a panel of Organic Light-Emitting Diodes (OLEDs) and the front-most panel 14 is provided by an array of Transparent Organic Light-Emitting Diodes (TOLEDs).

In further envisaged embodiments of the invention, the back-panel 10 provides a primary source of modulated light rays by means of a back-light source and a separate light-modulator. In such embodiments the back-light source may comprise any one or more of a laser, an LED, digital light projector, fluorescent light, Organic Light-Emitting Diode (OLED) and Transparent Organic Light-Emitting Diode (TOLED). The separate modulator comprises an array of individual light affecting pixels such as an LCD panel or mirror panel. It is preferable that the front-panel 14 is a single component integrally providing the light-emitting and light-modulating components, however in some envisaged embodiments the transparent front-panel 14 may provide secondary modulated light rays by means of a single transparent light source (such as a single TOLED) that is incident upon a transparent modulating element such as a transparent LCD.

It is preferable to use a single integral emitting and modulating components for both the back-panel 10 and front-panel 14 and even more preferable that these components are provided by an array of OLEDs or TOLEDs.

OLEDs emit light because of the recombination of an electron—hole pair in the emissive layer. The materials used in creating OLEDs are plastic, organic layers. The material properties of these layers enable the production of light in various colours and are thinner, lighter-weight and more flexible compared to the crystalline material layers in a Light-Emitting Diode (LED) or Liquid Crystal Display (LCD).

TOLEDs comprise only transparent components. The substrate, cathode and anode are all formed of transparent material such that when turned off, the TOLED panels have at least a 40% to 90% transparency. When a TOLED display is turned on, it allows light to pass in both directions. A transparent OLED (TOLED) display can be either Active- or Passive-Matrix or Total-Matrix Addressing TMA. Using a high-level transparent device for the front panel enhances the performance of the display device in terms of brightness, contrast ratio and dynamic range. In an optional embodiment of the invention a completely transparent display device is provided wherein both the back-panel 10 and front-panel 14 are formed from transparent light emitting material such as TOLED or transparent phosphorescent emissive material.

The substrate of an OLED can be flexible rather than rigid because the light-emitting layers of an OLED are lighter-weight and the substrates can be formed from plastic rather than glass (which is currently used for LEDs and LCDs). Furthermore the use of glass as a supporting substrate in LEDs and LCDs can degrade their brightness because of light absorption. OLEDs can have multi-layered conductive and emissive layers which provides for enhanced performance in terms of brightness over LEDs. OLEDs have larger fields of view compared to LCDs. This is because LCDs work by filtering or blocking light and therefore there is an inherent difficulty in viewing images at certain angles.

In this way, the front-most panel 14 provides a modulated light-source as well as the back-panel 10 providing a modulated light source. Each pixel of the backlight panel 10 can be independently modulated in order to generate a matrix of light outputs which are projected onto the front TOLED panel 14. The pixel elements of the TOLED front panel 14 are, similarly controlled. Modulated light is emitted by the front-most panel 14 as well as the light incident from the OLED back panel that is incident upon the front-most panel 14 being transmitted by that front-most panel 14. The intensities of the two emitted lights are added together and in this way the intensity of the output light is boosted by the front-most panel TOLED.

In embodiments where the front 14 and back panel 10 are made from TOLED and OLED panels the OLED panel 10 and TOLED panel 14 can be any of a combination of the known types of OLED including: Passive-Matrix OLED (PMOLED), Phosphorescent-OLED (PHOLED), Active-Matrix-OLED (AMOLED) and Flexible-OLED (FOLED). Active-Matrix OLEDs have lower power consumption and therefore offer particular advantage in the present application.

Each panel 10, 14 can be driven by any controller configuration(s) that selectively is able to activate an OLED pixel in both panels and modulate that light emitted by the pixel itself; specifically any combination of the following driver configurations could be used: active matrix, passive matrix and Total-Matrix Addressing (TMA). In other words, each pixel can be separately modulated. Any other suitable control means can be used (The driver circuitry is not shown in the FIG. 1).

In order to enhance the dynamic range of the luminance of the display 8 a configuration of pixels (corresponding to the Image) are activated in the back panel OLED 10 and likewise the same configuration of pixels in the front panel (TOLED) 14 are activated. This is done through the circutary driver (matrix) that modulates the individual OLED and TOLED pixels in the two panels. To achieve very dark pixels in the resulting image, corresponding pixels of both the backlight panel 10 and front-most panel 14 are switched either both to very low level output, both to an off-state or a combination where one pixel is off and one pixel is switched on to a very low level. To achieve pixels of maximum brightness in the resulting image, corresponding pixels of both the backlight panel 10 and front-most panel 14 are switched to their highest intensity output. The luminance from both sources is combined to achieve the brightest output on the display screen. To achieve the luminance levels in between the darkest dark and brightest bright, the light-emitting elements of both the front most panel 14 and back-most panel 10 are carefully adjusted and controlled.

In order to achieve a colour display, the front panel 14 is optionally a Red, Green, Blue (RGB) light-emitting panel. The wavelength (and hence colour) of light emitted is determined by the material from which the emissive layer of the light emitter is formed. The back panel 10 can be either a white light source providing light and dark contrast (in this case a WOLED can be used) or another RGB colour panel or alternatively a transparent panel. Other panel configurations are possible i.e. one panel for each RGB colours, where the back panel can be either one of the RGB colours panel or a only a luminance OLED panel. Alternatively, pixel elements emitting coloured light could be achieved by collating a red, green and blue light emitting OLED or TOLED within in each pixel element.

Turning to a second illustrated embodiment of the invention a device 108 comprises three front-most transparent panels 114, 120, 122. Preferably, these panels are TOLED matrix panels and wherein one panel 114 emits green light, one panel 120 emits blue light and one panel emits red light 122. In this way a full colour display is created. In order to take advantage of the boosted dynamic range provided by a combination of modulated light and a transparent emitter, it is preferable that each of the front-most transparent panels 114, 120, 122 has a transparency greater than at least 10%. It is not essential for each of the front-most transparent panels 114, 120, 122 to have the same or an equal level of transparency. The back-most panel 110 may be formed of a transparent emitting device matrix or a non-transparent emitting device matrix and/or may be formed of a white-light emitting material such as a WOLED.

The provision of four panels in total provides the possibility for even brighter highest luminance levels, though this may require the provision of a higher power source. Alternatively a similar level of power source to the arrangement of the first embodiment could be used. The luminance levels that can be achieved may be further enhanced by the provision of four panels, each panel having its own transmission level range.

Figure 3:
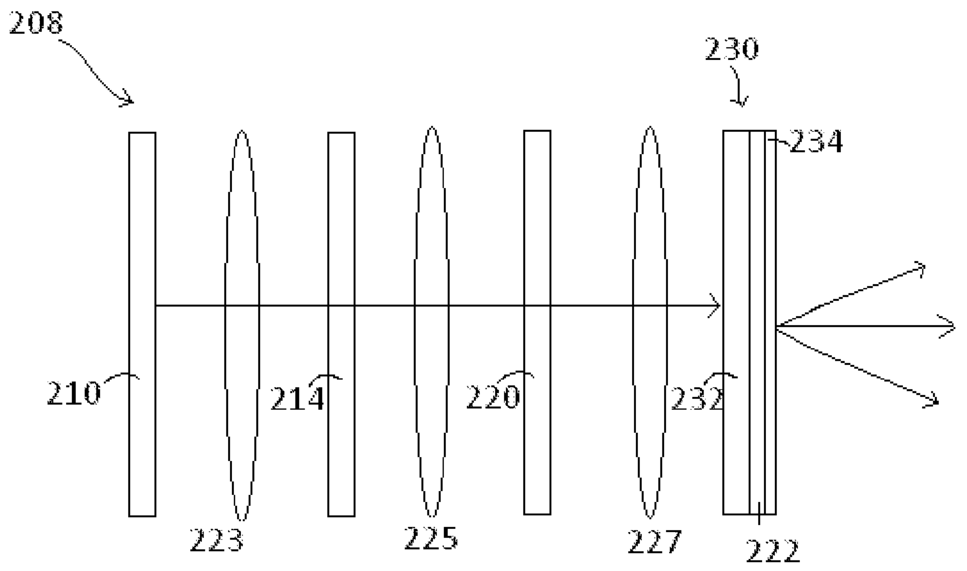
FIG. 3 shows schematically a display device according to a third embodiment of the invention.

A third embodiment of the invention is illustrated in FIG. 3. In this embodiment optical focussing means 223, 225, 227 is provided inbetween each of the panels 210, 214, 220, 222 to direct the light from the back panel 210 to a particular area of the immediately successive transparent panel 214; from the transparent panel 214 to the immediately successive transparent panel 220; and from the transparent panel 220 to the front-most transparent panel 222. The front-most transparent panel 222 forms part of a rear-projection display screen 230. Additionally, the display screen 230 comprises a collimator 232 and optional diffuser 234. Further collimators and/or diffusers may optionally be employed between other panels of the display device as well. The optical focussing means 223, 225, 227 are optional and, when present, make take various forms including, but not exclusively, a combination of optical lenses or optic fibre elements. The primary purpose of the collimator 232 is to cause light which passes through the rear-projection screen 230 to be directed toward a viewing area. The collimator may take various forms including, but not exclusively, one or more optical lenses, matrix of fibre optic elements, holographic lenses and/or Fresnel lenses. The diffuser element 234 is provided to scatter light emanating from the display screen 230 to enhance the viewing angles of the display 208.

The aforementioned optical focussing means 223, 225, 227; collimator 232 and diffuser 234 are entirely optional components that in other embodiments are not used or are used only between one pair of panels and not all panels; these elements may be used in combination with elements of the previously described and subsequently described embodiments. However it is preferable that the display device does comprise optical components for facilitating the incidence of primary modulated light rays emitted by the back panel(s) onto appropriately matched pixels of the front-most panel for combination with secondary modulated light rays created and emitted by that front-most panel. In order to create a display with a high contrast ratio and a high dynamic range at least two co-operating panels are utilized. The modulated out-put of the first panel must accurately and controllably be incident upon and transmissible through a second panel with a minimum attenuation of the primary modulated signal. The primary modulated signal can thereby be combined with a secondary modulated signal to add to the intensity of and increase the incremental adjustability of that secondary modulated signal to create a combined light out-put of greater total maximum intensity than either the primary or secondary signals and of greater adjustability than either the primary or secondary signals. In this way a super HDR display screen can be created.

As before at least the three front-most panels are preferably transparent emitting panels of similar, equal or different transparency (preferably equal). The back panel 210 may also be a transparent panel where it is required to produce an entirely transparent display 208 (known fully transparent displays are known as “heads-up” displays).

Figure 4:
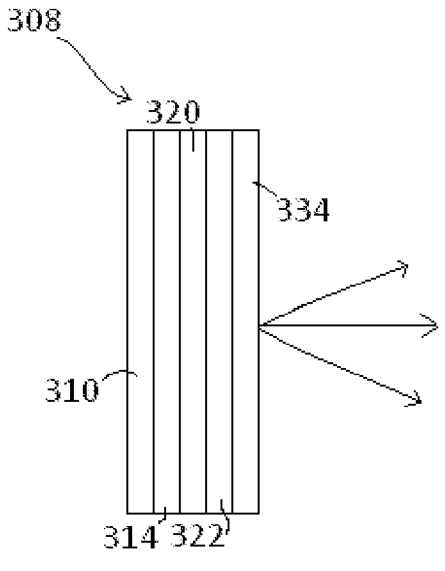
FIG. 4 shows schematically a display device according to a fourth embodiment of the invention.

Turning now to a fourth illustrated embodiment of FIG. 4, a display device 308 is shown having four primary panels. The back-panel 310 is a modulated light source such as an LED panel, but preferably an OLED or TOLED matrix panel. The back panel 310 is directly overlaid in contacting relationship with a first transparent panel 314. The first transparent panel 314 is also in this arrangement a modulated light-source having a transparency in the off-state of at least 10% and preferably 45% to 90% or more. Preferably, the first transparent panel 314 is formed of a TOLED matrix which may be printed (by ink-jet printing technology) directly onto the back-panel 310. Together the two panels 310, 314 provide modulated light output to generate a monochrome or colour image having a high dynamic range. Optionally and as a way of providing a colour image, second and third transparent layers 320, 322 are provided. These layers are also applied directly onto the previous layers to provide a stacked array of emitting layers. As such the layering of light-emissive sources, at least some of which are transparent is achieved at the micro-structure level.

At least the front-most layers 314, 320, 322 and optionally the back-most layer 310 have a transparency of at least 10%. The three front-most layers are configured to emit red, green and blue light (in that or any other order) thereby providing the means to create a full-colour image with high-dynamic range.

An optional diffuser 334 is provided to scatter the emitted light in order to achieve preferential viewing angles. The use of optical arrangements to provide light focussing means for the light output from one layer and to be incident on a next layer are not required when the pixel elements of one layer are directly overlaid onto the pixel elements of the next layer.

In each of the embodiments described, there are various advantageous features. The first is the use of a transparent layer or panel disposed in front of the back-modulated light source. The transparency level of this panel being of such a level that the dynamic range and/or contrast of the display is enhanced compared to known devices. A second advantageous feature is the combination of that transparency quality with an emissive quality. To achieve this a TOLED matrix, a transparent electroluminescent (EL) device or other transparent emissive device may be used. This improves the dynamic range and/or contrast ratio of the display. A further advantageous feature is the use of an OLED or TOLED panel as the back-most panel or layer of the device. Compared to current LED matrix technology the use of an OLED or TOLED panel for providing a modulated light source within the display device provides the following benefits:

1) the power consumption is low; an OLED and/or TOLED can be powered from an USB port;
2) no or significantly reduced overeating problems and no cooling is required;
3) the display may be built to any size, from smaller mobile phone type applications up to larger scale display screens for event use;
4) the device is very thin and light-weight and OLED and/or TOLED substrates can be plastic rather than glass and as such less fragile;
5) the transparency of the TOLED is usually 70-80% when switched off, when switched on it is lower, but still greater than an LCD panel. This means that the dynamic range can be boosted or enhanced compared to current HDR displays;
6) the use of flexible OLED and/or TOLED may enable the display devices to have a flexible quality;
7) the emitting layers can be deployed in a front projection display system for cinema applications;
8) the resolution of the back and front most panels can be the same to reduce the computation power involved; and
9) the colours obtainable are often improved compared to LED technology.

It can be appreciated that various changes may be made within the scope of the present invention, for example, the size and shape of the panels may be adjusted to accommodate various display screen requirements. The display screens embodying the present invention may be rear-projection screens or front-projection screens. The light emitting elements of the display devices described may be employed in a projecting element for coupling to front projection screens. In such applications, the projecting device may comprise optical components to focus the image onto a distant display screen. Such devices have application in cinema and other large display projection screens.

In other embodiments of the invention it is envisaged that the pixel output from one panel is not aligned directly with the pixel output of the subsequent panel, but rather the pixels are off-set one another and the output of the display is controlled by a programmable drive mechanism(s). The shape of the pixels from any panel may be other than square. In the preferred embodiments the pixels are round, square or hexagonal. Other shapes are however envisaged and indeed combinations of shapes of pixels are envisaged in other embodiments.

In an optional variation of the embodiments described, the back panel 10 (which is acting as a back light system) has a lower or equal resolution (in terms of the number of pixels) as the front panel 14.

The display devices described may comprise other elements such as anti-glare and/or anti-scratch coatings which may be applied to the outer surface of the display screen.

In yet further envisaged embodiments of the invention known LCD technology could be utilized in combination with the aforementioned beneficial features of the present invention. For example, the rear-most modulated light source could be replaced with a single back-light source and separate, preferably transparent, LCD element. In front of this a light-emitting panel having a high level of transparency could be employed to enhance the luminance and hence dynamic range of the overall display device and/or to provide colour through coloured filters. The back-light source and transparent emissive panel simply providing white or if required coloured light.

In further embodiments of the invention, it may be possible to utilize a transparent LCD panel in combination with one or more OLED and/or TOLED panels to create a display device having enhanced dynamic range performance.

It will be recognised that as used herein, directional references such as "front" and "back", do not necessarily limit the respective panels to such orientation, but merely serve to distinguish these panels from one another and provide a guide as to which panels would act as the back of a screen.

The invention claimed is:

1. A high dynamic range display device comprising:

a first light-source having a first modulator to generate primary modulated light rays;

a second light-source having a second modulator operable independently of the first light-source and the first modulator to generate secondary modulated light rays; and one or more optical components disposed between the first light-source and the first modulator and the second light-source and the second modulator for focusing the primary modulated light rays onto the second light-source and the second modulator, the second light-source and the second modulator being transparent and being disposed relative to the first light-source such that the primary modulated light rays generated by the first light-source are focused on and are transmittable through the second light-source and the second modulator whereby a composite light-output comprising both primary and secondary modulated light rays is generated, the composite light-output having a greater luminance dynamic range than either the primary modulated light rays or the secondary modulated light rays.

2. A display device according to claim 1 wherein the first light-source comprises any one or more of a laser, an LED, digital light projector, and Organic Light-Emitting Diode (OLED) and the first modulator comprises an array of individual light affecting pixels such as an LCD panel or transparent LCD panel.

3. A display device according to claim 1 wherein the first light-source and the first modulator are provided as an integral component comprising any of a laser, an LED, an Organic Light-Emitting Diode (OLED) and a Transparent Organic-Light Emitting Diode (TOLED) arranged as an array of individual modulated light emitting pixels.

4. A display device according to claim 3 wherein the array of individual modulated light emitting pixels comprises a matrix of Organic Light-Emitting Diodes (OLEDs), TOLEDs, PHOLEDs, WOLEDs, PMOLEDs or AMOLEDs.

5. A display device according to claim 1 wherein the second light-source and the second modulator are provided as an integral component comprising an array of transparent electro-luminescent pixels.

6. A display device according to claim 5 wherein the off-state transparency of the first and/or second light-source is greater than about 10%.

7. A display device according to claim 5 wherein the off-state transparency of the first and/or second light-source is between about 45% and about 75%.

8. A display device according to claim 5 wherein the off-state transparency of the first and/or second light-source is between about 45% and about 95%.

9. A display device according to claim 1 wherein the second light-source and the second modulator are provided as an integral component comprising an array of Transparent Organic Light-Emitting Diode (TOLED) pixels.

10. A display device according to claim 1 further comprising at least one additional light-source having an integrally formed modulator operable to generate additional modulated light rays; the or each additional light-source being transparent and being disposed relative to the second and first light-sources such that the composite light-output comprising both primary and secondary modulated light rays generated by the first and second light-sources is transmittable through the or each additional light-source whereby a further composite light-output comprising primary, secondary and one or more additional modulated light rays is generated.

11. A display device according to claim 10 wherein the or each additional light-source comprises an array of Transparent Organic Light-Emitting Diode (TOLED) pixels.

12. A display device according to claim 11 wherein the off-state transparency of the or each additional light-source is greater than about 10% and/or is between about 45% and about 75% or is between about 45% and about 95%.

13. A display device according to claim 10 wherein the or each additional light-source comprises an array of transparent electro-luminescent pixels.

14. A display device according to claim 10 wherein the second light-source comprises an array of TOLED pixels and wherein there comprises two additional light-sources each comprising an array of TOLED pixels and wherein one of the second and two additional light-sources emits red-coloured light, another of the second and two additional light-sources emits green-coloured light and the remaining one of the second and two additional light-sources emits blue-coloured light.

15. A display device according to claim 10 wherein the first light-source and the first modulator are provided as an integral component comprising Transparent Organic-Light Emitting Diodes (TOLEDs) arranged as an array of individual modulated light emitting pixels such that the display device is transparent.

16. An electronic device having a digital display screen comprising a display device according to claim 1.

17. An electronic device according to claim 16 wherein the digital display screen is curved and/or flexible and/or a touch-screen.

18. A television, computer monitor, hand held electronic device, mobile telephone or mobile communication device having one or more display devices according to claim 1.

19. An analytic instrument having one or more display devices according to claim 1.

20. An analytic instrument according to claim 19 wherein the analytic instrument is an electronic microscope.

21. A navigation system having one or more display devices according to claim 1.

22. A head mounted display having one or more display devices according to claim 1.

23. A rear-projection display having one or more display devices according to claim 1.

24. An Automatic Virtual Environment, in particular a Cave Automatic Virtual Environment (CAVE) having one or more display devices according to claim 1.

25. An advertising medium having one or more display devices according to claim 1.

26. An advertising medium according to claim 25 wherein the advertising medium is a digital bill board.

27. A front-projection digital display system comprising a projector having a display device according to claim 1, an optical focusing element and a display screen, the projector being coupled to the optical focusing element for focusing an image generated by the projector onto the front of the display screen.

* * * * *